United States Patent
Sato

(10) Patent No.: US 9,631,075 B2
(45) Date of Patent: Apr. 25, 2017

(54) RUBBER COMPOSITION FOR TIRE AND TIRE

(71) Applicant: SUMITOMO RUBBER INDUSTRIES, LTD., Kobe-shi, Hyogo (JP)

(72) Inventor: Daisuke Sato, Kobe (JP)

(73) Assignee: SUMITOMO RUBBER INDUSTRIES, LTD., Kobe-shi (JP)

( * ) Notice: Subject to any disclaimer, the term of this patent is extended or adjusted under 35 U.S.C. 154(b) by 95 days.

(21) Appl. No.: 14/836,693

(22) Filed: Aug. 26, 2015

(65) Prior Publication Data

US 2016/0090474 A1    Mar. 31, 2016

(30) Foreign Application Priority Data

Sep. 25, 2014    (JP) .................. 2014-195250

(51) Int. Cl.
*C08L 9/06*       (2006.01)
*B60C 1/00*       (2006.01)
*C08K 3/36*       (2006.01)

(52) U.S. Cl.
CPC .............. *C08L 9/06* (2013.01); *B60C 1/0016* (2013.04); *C08K 3/36* (2013.01); *C08L 2205/02* (2013.01); *C08L 2205/025* (2013.01)

(58) Field of Classification Search
CPC ...................................... C08L 9/06
USPC ........................................ 523/156
See application file for complete search history.

(56) References Cited

U.S. PATENT DOCUMENTS

| | | | |
|---|---|---|---|
| 5,328,746 A * | 7/1994 | Okuyama | B41M 5/395 428/212 |
| 6,472,464 B1 | 10/2002 | Morita et al. | |
| 7,253,235 B2 | 8/2007 | Nishioka et al. | |
| 7,351,761 B2 | 4/2008 | Hochi | |
| 2006/0052506 A1 | 3/2006 | Aoki | |
| 2010/0186859 A1* | 7/2010 | Zhao | B60C 1/0016 152/209.5 |
| 2011/0294936 A1* | 12/2011 | Sato | B60C 1/0016 524/315 |
| 2014/0011944 A1 | 1/2014 | Kondo | |

FOREIGN PATENT DOCUMENTS

| | | |
|---|---|---|
| EP | 2 154 006 A1 | 2/2010 |
| EP | 2 599 645 A1 | 6/2013 |
| EP | 2 662 405 A1 | 11/2013 |
| EP | 2 674 454 A1 | 12/2013 |
| JP | 8-53002 A | 2/1996 |
| JP | 9-316132 A | 12/1997 |
| JP | 2004-143244 A | 5/2004 |
| JP | 2006-056919 A | 3/2006 |
| JP | 2007-197671 A | 8/2007 |
| JP | 2008-101158 A | 5/2008 |
| JP | 2011-089081 A | 5/2011 |
| JP | 2011-246640 A | 12/2011 |

* cited by examiner

*Primary Examiner* — Doris Lee
(74) *Attorney, Agent, or Firm* — Birch, Stewart, Kolasch & Birch, LLP

(57) ABSTRACT

An object of the present invention is to provide a rubber composition for tire which has less performance change with respect to a temperature change at a high temperature region and has less performance change with respect to a road surface change from a wet road surface to a dry road surface, and a tire which has a tire member composed of the rubber composition for tire. The rubber composition for tire of the present invention is a rubber composition for tire in which a complex modulus $G^*_{50°\ C.}$ and a complex modulus $G^*_{100°\ C.}$ satisfy the following formula (1): $G^*_{100°\ C.}/G^*_{50°\ C.} > 0.85$, an elongation at break $EB_{23°\ C.}$ and a loss tangent $\tan\delta_{50°\ C.}$ is not less than 0.12. The present invention also refers to a tire which has a tire member composed of the rubber composition for tire.

8 Claims, No Drawings

RUBBER COMPOSITION FOR TIRE AND TIRE

TECHNICAL FIELD

The present invention relates to a rubber composition for tire and a tire which has a tire member composed of the rubber composition.

BACKGROUND OF THE INVENTION

In recent years, safety awareness has been enhanced as a common problem to be solved in the car industry and a further improvement of wet grip performance and steering stability is required. Various studies have been done so far for improving wet grip performance and many inventions of a rubber composition comprising silica have been reported. Since tire performance depends on various factors such as a tire structure or a material to be used for tire and strongly depends on performance of a rubber composition particularly at a tread portion contacting a road surface, a technical improvement of a rubber composition for tire such as a tread has been widely considered and put into practical use.

Because of the technical improvement of a rubber composition for tread comprising silica, a significant progress is brought to wet grip performance of a tire. On the other hand, steering stability has not been improved sufficiently and has room for improvement. In particular, a performance change with respect to a temperature change due to running at a high temperature region or a performance change with respect to a case where a road surface change such as from a wet road surface to a dry road surface is occurred remains an important technical problem to be solved and has room for improvement. Additionally, though many studies have been done with respect to temperature dependence or dependence on road surface of a rubber composition at an extremely low temperature region which is a use environment of snow tires, such dependence at a high temperature region such as a dry road surface is not considered.

In JP 2006-056919 A, JP 2007-197671 A and JP 2008-101158 A, there is disclosed a rubber composition for tire comprising a predetermined amount of a predetermined diene rubber and silica, but a control of a performance change (temperature dependence and dependence on road surface) at a high temperature region such as a dry road surface is not considered. Further, though JP 2011-089081 A discloses a rubber composition which can decrease temperature dependence of hardness, a performance change with respect to a road surface change from a wet road surface to a dry road surface is not considered.

SUMMARY OF THE INVENTION

An object of the present invention is to provide a rubber composition which has less performance change with respect to a temperature change at a high temperature region and has less performance change with respect to a road surface change from a wet road surface to a dry road surface, and a tire which has a tire member composed of the rubber composition for tire.

The present invention refers to a rubber composition for tire in which a complex modulus $G^*_{50°\ C.}$ at 50° C. and a dynamic strain amplitude of 5%, and a complex modulus $G^*_{100°\ C.}$ at 100° C. and a dynamic strain amplitude of 5% satisfy the following formula (1), an elongation at break $EB_{23°\ C.}$ in a tensile test at 23° C. is not less than 350% and a loss tangent $\tan\delta_{50°\ C.}$ at 50° C. and a dynamic strain amplitude of 1% is not less than 0.12.

$$G^*_{100°\ C.}/G^*_{50°\ C.}>0.85 \quad\quad \text{Formula (1):}$$

It is further preferable that an elongation at break $EB_{100°\ C.}$ in a tensile test at 100° C. and a modulus $Mi_{100°\ C.}$ when stretched by 100% at 100° C. satisfy the following formula (2).

$$2500<EB_{100°\ C.}\times M_{100°\ C.}<4500 \quad\quad \text{Formula (2):}$$

It is further preferable that Shore hardness $HS_{50°\ C.}$ at 50° C., a complex modulus $E^*$ at 50° C. and a dynamic strain amplitude of 1%, and a loss tangent $\tan\delta_{50°\ C.}$ at 50° C. and a dynamic strain amplitude of 1% satisfy the following formula (3).

$$0.05<(\tan\delta_{50°\ C.})^2/(E^*\times HS_{50°\ C.})\times 1000 \quad\quad \text{Formula (3):}$$

It is further preferable that a loss tangent $\tan\delta_{-10°\ C.}$, $\tan\delta_{-5°\ C.}$, $\tan\delta_{0°\ C.}$, $\tan\delta_{5°\ C.}$, $\tan\delta_{10°\ C.}$, $\tan\delta_{15°\ C.}$, and $\tan\delta_{20°\ C.}$ at each temperature from −10° C. up to 20° C. at an interval of 5° C. and a dynamic strain amplitude of 0.25% satisfy the following formula (4).

$$2.5<\tan\delta_{-10°\ C.}+\tan\delta_{-5°\ C.}+\tan\delta_{0°\ C.}+\tan\delta_{5°\ C.}+\tan\delta_{10°\ C.}+\tan\delta_{15°\ C.}+\tan\delta_{20°\ C.}<4.5 \quad\quad \text{Formula (4):}$$

It is preferable that the rubber composition comprises a rubber component comprising not less than 50% by mass of a diene rubber in which a content of styrene is 25 to 50% by mass and a vinyl bond amount is 10 to 35 mol %.

It is preferable that the content of styrene is two times or more of the vinyl bond amount.

It is preferable that the rubber composition comprises 5 to 150 parts by mass of silica which has a nitrogen adsorption specific surface area of not less than 50 m²/g based on 100 parts by mass of the rubber component.

The present invention further relates to a tire which has a tire member composed of the rubber composition.

According to the present invention, a rubber composition for tire which has less performance change with respect to a temperature change due to running at a high temperature region and has less performance change with respect to a road surface change from a wet road surface to a dry road surface, and a tire which has a tire member composed of the rubber composition for tire can be provided, by using a rubber composition for tire in which a complex modulus $G^*_{50°\ C.}$ at 50° C. and a dynamic strain amplitude of 5% and a complex modulus $G^*_{100°\ C.}$ at 100° C. and a dynamic strain amplitude of 5% satisfy a predetermined formula, and an elongation at break $EB_{23°\ C.}$ in a tensile test at 23° C. and a loss tangent $\tan\delta_{50°\ C.}$ at 50° C. and a dynamic strain amplitude of 1% are within a predetermined range.

DETAILED DESCRIPTION

The rubber composition for tire of the present invention is characterized in that a complex modulus $G^*_{50°\ C.}$ at a temperature of 50° C. and a dynamic strain amplitude of 5% and a complex modulus $G^*_{100°\ C.}$ at a temperature of 100° C. and a dynamic strain amplitude of 5% satisfy the following formula (1), and an elongation at break $EB_{23°\ C.}$ in a tensile test at 23° C. and a loss tangent $\tan\delta_{50°\ C.}$ at a temperature of 50° C. and a dynamic strain amplitude of 1% are within a predetermined range.

$$G^*_{100°\ C.}/G^*_{50°\ C.}>0.85 \quad\quad \text{Formula (1):}$$

A complex modulus $G^*$ in the specification refers to a complex modulus at torsional shearing measured with a rheometer ARES manufactured by TA Instruments Inc. By measuring a value of complex modulus with a rheometer, rubber characteristics in a condition close to that under high deformation when turning on a dry road surface in an actual car to which tires are loaded can be examined. In addition, by setting a temperature, an examination in the case where a surface temperature of a tire is a set temperature. That is, $G^*_{50°\ C.}$ in the formula (1) is an index of tire characteristics when tires having a surface temperature of 50° C. turn on a dry road surface, and $G^*_{100°\ C.}$ is an index of tire characteristics when tires having a surface temperature of 100° C. turn on a dry road surface.

When running a general vehicle in a summer season, the temperature of the surface of tires immediately after start is around 50° C. and reaches 70° C. to 80° C. during running. Further, when running on an autobahn in Europe or the like at high speed, the temperature reaches a range of 100° C. That is, $G^*_{50°\ C.}$ in the formula (1) is an index of tire characteristics of tires immediately after start in a dry road surface, and $G^*_{100°\ C.}$ is an index of tire characteristics of tires at a high temperature region such as running on the dry road surface at high speed.

Namely, a change between performance immediately after start on the dry road surface ($G^*_{50°\ C.}$) and performance at a high temperature region ($G^*_{100°\ C.}$) becomes smaller as the value of the formula (1) becomes closer to 1, and it indicates that a performance change at a high temperature is smaller.

It is extremely important that the value of the formula (1) exceeds 0.85 in providing a rubber composition which has less performance change and preferably exceeds 0.88, further preferably exceeds 0.92. If the value of the formula (1) is 0.85 or less, performance change at a high temperature region increases and performance tends to change such that a driver can sense. It is noted that an upper limit of the value of the formula (1) is, as described above, preferably not more than 1.

The elongation at break $EB_{23°\ C.}$ in a tensile test at a temperature of 23° C., and the loss tangent $\tan\delta_{50°\ C.}$ at a temperature of 50° C. and a dynamic strain amplitude of 1% are an index of strength, durability and grip characteristics which are essential for a rubber composition for tire.

The elongation at break $EB_{23°\ C.}$ in a tensile test at 23° C. is not less than 350%, preferably not less than 450%, more preferably not less than 550%. If the $EB_{23°\ C.}$ is less than 350%, the strength as a rubber composition for tire is insufficient and durability tends to be insufficient. An upper limit of the $EB_{23°\ C.}$ is not limited particularly, but since broken rubber can be properly cut off from the rubber surface and satisfactory abrasion appearance can be obtained, the upper limit is preferably not more than 700%, more preferably not more than 650%.

The loss tangent $\tan\delta_{50°\ C.}$ at 50° C. and a dynamic strain amplitude of 1% is not less than 0.12 and preferably not less than 0.17. If the $\tan\delta_{50°\ C.}$ is less than 0.12, there is a tendency that energy loss is too low to obtain grip characteristics required for tires and sufficient safety cannot be ensured. An upper limit of the $\tan\delta_{50°\ C.}$ is not limited particularly, but since heat generation of rubber can be prevented and durability is improved, the $\tan\delta_{50°\ C.}$ is preferably not more than 0.45, more preferably not more than 0.40.

One of the factors that influences a performance change between tires immediately after start on the dry road surface and tires at a high temperature region such as at running on the dry road surface at high speed is an influence of abrasion form of rubber for cap tread which contacts the road surface. When a certain external force and a deformation amount are applied to a cap tread or the like, rubber is broken and cut from the rubber surface, exhibiting satisfactory abrasion appearance. On the other hand, when the strength of the rubber is too strong with respect to the external force, the rubber is not cut off and remains on the surface in a stretched state, thereby cause an abrasion mark having a unique protrusion. Because of this abrasion mark, a contact area with the road surface is decreased and a grip force is decreased. In addition, the unique protrusion is broken and arises a broken mark.

The generation of the abrasion mark and broken mark can be prevented by using a rubber composition having a specific rubber strength. In the present invention, a product of an elongation at break $EB_{100°\ C.}$ in a tensile test at a temperature of 100° C., and a modulus $M_{100°\ C.}$ when stretched by 100% at a temperature of 100° C. is used as an index of the rubber strength and it is preferable that the following formula (2) is satisfied.

$$2500 < EB_{100°\ C.} \times M_{100°\ C.} < 4500 \quad \text{Formula (2):}$$

The value of the formula (2) exceeds preferably 2500, more preferably 3200, further preferably 3800. If the value of the formula (2) is not more than 2500, there is a tendency that the rubber strength is low and an abrasion mark such as a crack is arisen and this crack grows and possibly causes a damage such as a lack of a block of tread rubber. On the other hand, the value of the formula (2) is preferably not more than 4500, more preferably not more than 4200, further preferably not more than 4000. If the value of the formula (2) exceeds 4500, an effect of preventing the abrasion mark having the protrusion tends not to be brought sufficiently.

The rubber composition of the present invention is, as described above, a rubber composition for tire which prevents, by satisfying the formula (1), a complex modulus from decreasing due to a temperature range at a high temperature region and has less performance change. On the other hand, since the increased temperature does not decrease the complex modulus, road noise of the tire may get worse. The road noise is an important tire characteristic relating also to a noise problem and in Europe, the regulation of the road noise is already begun.

The generation of the road noise is considered to be influenced by a vibration of rubber generating when slipping on the road surface and which can be explained by a vibration transmission and a damping force. In the present invention, the vibration transmission is considered to be influenced by a rigidity of the rubber and a vibration transmission due to deformation of a contact surface between the rubber and the road surface is shown by an index of a complex modulus E* at a temperature of 50° C. and a dynamic strain amplitude of 1%, a vibration transmission due to a tire block is shown by an index of a Shore hardness $HS_{50°\ C.}$ at a temperature of 50° C., and a damping force is shown by an index of a loss tangent $\tan\delta_{50°\ C.}$ at 50° C. and a dynamic strain amplitude of 1%. Additionally, it is preferable to satisfy the following formula (3).

$$0.05 < (\tan\delta_{50°\ C.})^2 / (E^* \times HS_{50°\ C.}) \times 1000 \quad \text{Formula (3):}$$

The larger the value of the formula (3) is, the smaller the road noise is and that can be suitably used as a tire. It is preferable that the value of the formula (3) exceeds 0.05, more preferably 0.07, further preferably 0.09. If the value of the formula (3) is not more than 0.05, there is a tendency that road noise is deteriorated and it becomes impossible to meet the requirements of the marketplaces, and additionally, a squeal may be arisen at changing a lane.

Further, in order to reduce a performance change with respect to a road surface change from a wet road surface to a dry road surface, it is necessary to also consider viscoelasticity characteristics under a condition close to a temperature state on the dry road surface. Moreover, in consideration of wet skid performance on various road surfaces, characteristics at a plurality of frequencies should be considered and a rubber composition for tire which can exert stable wet skid performance under various environments can be obtained if the following formula (4) is satisfied using a frequency-temperature conversion rule.

According to the frequency-temperature conversion rule, it is preferable that a loss tangent $\tan\delta_{-10°\ C.}$, $\tan\delta_{-5°\ C.}$, $\tan\delta_{0°\ C.}$, $\tan\delta_{5°\ C.}$, $\tan\delta_{10°\ C.}$, $\tan\delta_{15°\ C.}$ and $\tan\delta_{20°\ C.}$ at each temperature from $-10°$ C. up to $20°$ C. at an interval of $5°$ C. and a dynamic strain amplitude of 0.25% satisfy the following formula (4).

$$2.5 < \tan\delta_{-10°\ C.} + \tan\delta_{-5°\ C.} + \tan\delta_{0°\ C.} + \tan\delta_{5°\ C.} + \tan\delta_{10°\ C.} + \tan\delta_{15°\ C.} + \tan\delta_{20°\ C.} < 4.5 \quad \text{Formula (4):}$$

The value of the formula (4) exceeds preferably 2.5, more preferably 2.7, further preferably 3.0. If the value of the formula (4) is not more than 2.5, there is a tendency that sufficient wet skid performance or dry grip performance cannot be obtained. Though there is a tendency that the larger the value of the formula (4) is, the more sufficiently wet skid performance and dry grip performance meets the requirements of the marketplaces, the value is generally less than 4.5.

It is preferable that the rubber composition for tire of the present invention is a rubber composition for tire comprising a specific rubber component.

An example of the rubber component is a diene rubber and examples of the diene rubber include a natural rubber (NR), an isoprene rubber (IR), a butadiene rubber (BR), a styrene-butadiene rubber (SBR), an acrylonitrile-butadiene rubber (NBR), a chloroprene rubber (CR), a butyl rubber (IIR) and a styrene-isoprene-butadiene rubber (SIBR). These diene rubbers may be used alone, or may be used in combination with two or more thereof. Among them, it is preferable to use the NR, BR and SBR since grip performance and abrasion resistance can be obtained in a favorable balance, and it is more preferable to use the SBR. Additionally, the combined use of the NR and SBR, the BR and SBR, and the NR, BR and SBR is also preferable.

Further, it is preferable to use a diene rubber having a styrene content of 25 to 50% by mass and a vinyl bond amount of 10 to 35 mol % since wet skid performance, dry grip performance and fuel efficiency can be obtained in a favorable balance. Examples of a diene rubber comprising a styrene and a vinyl include the SBR and SIBR.

The styrene content of the diene rubber is preferably not less than 25% by mass, preferably not less than 30% by mass, more preferably not less than 35% by mass. If the styrene content is less than 25% by mass, it is difficult to obtain a rubber composition which satisfies the formula (4) on both a dry road surface and a wet road surface, and grip performance is insufficient. On the other hand, the styrene content of the diene rubber is preferably not more than 50% by mass, more preferably not more than 45% by mass, further preferably not more than 42% by mass. If the styrene content exceeds 50% by mass, there is a tendency that a glass-transition temperature of the rubber composition is increased too high, temperature dependence is high and it becomes difficult to satisfy the formulas (1) and (4).

The vinyl bond amount of the diene rubber is preferably not less than 10 mol %, more preferably not less than 15 mol %, further preferably not less than 18 mol %. If the vinyl bond amount is less than 10 mol %, there is a tendency that a reactivity with silica is poor and the rubber strength or abrasion resistance is deteriorated. On the other hand, the vinyl bond amount of the diene rubber is preferably not more than 35 mol %, more preferably not more than 30 mol %, further preferably not more than 25 mol %, most preferably not more than 23%. If the vinyl bond amount exceeds 35 mol %, there is a tendency that a glass-transition temperature of the rubber composition is increased too high, temperature dependence is high and it becomes difficult to satisfy the formulas (1) and (4).

In the case where the rubber composition comprises a diene rubber having a predetermined styrene content and vinyl bond amount, the content thereof in the rubber component is preferably not less than 50% by mass, more preferably not less than 70% by mass. If the content of the diene rubber is less than 50% by mass, there is a tendency that it becomes difficult to satisfy the formula (1) and performance change at a high temperature region becomes larger. To satisfy the formula (1) and make the performance change at a high temperature region, it is preferable that the content of the diene rubber is 100% by mass, but when other rubber components are used together, the content can be not more than 95% by mass or not more than 90% by mass.

To achieve both wet skid performance and energy efficiency, in the diene rubber, the content of styrene is preferably two times or more of the vinyl bond amount, more preferably 2.2 times or more of the vinyl bond amount, further preferably 2.5 times or more of the vinyl bond amount. The upper limit is not limited particularly but it is preferable that the content of styrene is 3.0 times or less of the vinyl bond amount in the diene rubber. If the content of styrene exceeds 3.0 times of the vinyl bond amount, there is a tendency that a glass-transition temperature becomes too high and energy efficiency and low temperature characteristics are significantly deteriorated.

The SBR is not limited particularly and for example, an emulsion polymerized SBR (E-SBR) obtained by emulsion polymerization, a solution polymerized SBR (S-SBR) obtained by solution polymerization and various SBRs such as modified SBR (modified E-SBR, modified S-SBR) of the above SBRs. Among these, the S-SBR is preferable since energy efficiency and abrasion resistance can be successfully improved.

The NR is not limited particularly and ones generally used in tire industry can be used, and examples thereof include SIR20, RSS#3, TSR20 and the like.

The BR is not limited particularly and ones generally used in tire industry can be used, and examples thereof include a BR having a cis content of not less than 95% (high-cis BR), a rare-earth-metal-catalyzed butadiene rubber (rare-earth-metal-catalyzed BR) synthesized with a rare earth element containing catalyst, a BR comprising syndiotactic polybutadiene crystals (SPB-containing BR), a modified BR and the like. Among these, it is preferable to use the high-cis BR since abrasion resistance is excellent.

When the rubber composition comprises the BR, the content thereof in the rubber component is preferably not less than 5% by mass, more preferably not less than 10% by mass. If the content of the BR is less than 5% by mass, the effect of improving abrasion resistance tends to be difficult to be obtained. On the other hand, the content of the BR is preferably not more than 35% by mass, more preferably not more than 25% by mass. If the content of the BR exceeds 35% by mass, dry grip performance tends to be deteriorated significantly.

In addition to the above rubber components, the rubber composition for tire of the present invention may also appropriately comprise compounding agents conventionally used in the production of rubber compositions and the examples thereof include a filler for reinforcement such as silica and carbon black, a zinc oxide, a stearic acid, various anti-aging agents, oil such as aroma oil, wax, a vulcanization agent such as sulfur, various vulcanization accelerators and the like.

The silica is not limited particularly and examples thereof include dry processed silica (silicic anhydride) and wet processed silica (hydrous silicic acid) and dry processed silica is preferable because it has more silanol groups.

A nitrogen adsorption specific surface area ($N_2SA$) of silica is preferably not less than 50 $m^2/g$, more preferably not less than 100 $m^2/g$. If the $N_2SA$ of silica is less than 50 $m^2/g$, there is a tendency that reinforcing property is not sufficient and rubber strength cannot be obtained sufficiently. On the other hand, the $N_2SA$ of silica is preferably not more than 250 $m^2/g$, more preferably not more than 200 $m^2/g$. If the $N_2SA$ of silica exceeds 250 $m^2/g$, there is a tendency that it becomes difficult to disperse silica in a kneaded product and energy efficiency and abrasion resistance are deteriorated. It is noted that in the present invention, the $N_2SA$ of silica is a value measured according to the method A of JIS K 6217.

When the rubber composition comprises silica, the content thereof based on 100 parts by mass of the rubber component is preferably not less than 5 parts by mass, more preferably not less than 60 parts by mass, more preferably not less than 80 parts by mass. If the content of silica is less than 5 parts by mass, there is a tendency that a sufficient reinforcing property of silica is difficult to be obtained and durability is deteriorated. On the other hand, the content of silica is preferably not more than 150 parts by mass, more preferably not more than 130 parts by mass, further preferably not more than 110 parts by mass. If the content of silica exceeds 150 parts by mass, there is a tendency that the rubber becomes too hardened and it becomes difficult to satisfy the formula (4).

When the rubber composition comprises silica, it is preferable to use a silane coupling agent together with silica. The silane coupling agent may be used alone, or may be used in combination with two or more thereof. Examples of the silane coupling agent include bis(3-triethoxysilylpropyl) trisulfide, bis(3-triethoxysilylpropyl)tetrasulfide, bis(3-triethoxysilylpropyl)disulfide, bis(2-triethoxysilylethyl)tetrasulfide, bis(3-trimethoxysilylpropyl)tetrasulfide, bis(2-trimethoxysilylethyl)tetrasulfide, 3-mercaptopropyltrimethoxysilane, 3-mercaptopropyltriethoxysilane, 2-mercaptoethyltrimethoxysilane, 2-mercaptoethyltriethoxysilane, 3-trimethoxysilylpropyl-N,N-dimethylthiocarbamoyl tetrasulfide, 3-triethoxysilylpropyl-N, N-dimethylthiocarbamoyl tetrasulfide, 2-triethoxysilylethyl-N,N-dimethylthiocarbamoyl tetrasulfide, 3-trimethoxysilylpropylbenzothiazolyl tetrasulfide, 3-triethoxysilylpropylbenzothiazole tetrasulfide, 3-triethoxysilylpropyl methacrylate monosulfide, 3-trimethoxysilylpropyl methacrylate monosulfide, bis(3-diethoxymethylsilylpropyl)tetrasulfide, 3-mercaptopropyldimethoxysilane, 2-dimethoxymethylsilylpropyl-N,N-dimethylthiocarbamoyl tetrasulfide, 2-dimethoxymethylsilylpropylbenzothiazolyl tetrasulfide and the like. Among these, it is preferable to use bis(3-triethoxysilylpropyl)disulfide since it is relatively reasonable and easy to deal with.

When the rubber composition comprises a silane coupling agent, the content of the silane coupling agent based on 100 parts by mass of silica is preferably not less than 3 parts by mass, more preferably not less than 5 parts by mass. If the content of the silane coupling agent is less than 3 parts by mass, there is a tendency that a coupling effect is insufficient and a high dispersion of silica is not obtained, thereby deteriorating energy efficiency and breaking strength. On the other hand, the content of the silane coupling agent is preferably not more than 15 parts by mass, more preferably not more than 10 parts by mass. If the content of the silane coupling agent exceeds 15 parts by mass, there is a tendency that an excess silane coupling agent remains and processability and breaking characteristics of a rubber composition to be obtained are deteriorated.

Since satisfactory wet grip performance and abrasion resistance can be obtained more suitably, it is preferable that the rubber composition comprises carbon black. Examples of carbon black include ones generally used in tire industry such as GPF, HAF, ISAF, SAF and the like.

The BET specific surface area of the carbon black is preferably not less than 50 $m^2/g$, more preferably not less than 100 $m^2/g$, further preferably not less than 120 $m^2/g$. If the BET specific surface area is less than 50 $m^2/g$, sufficient wet grip performance and abrasion resistance may not be obtained. On the other hand, the BET specific surface are of the carbon black is preferably not more than 200 $m^2/g$, more preferably not more than 180 $m^2/g$. If the BET specific surface area exceeds 200 $m^2/g$, there is a tendency that it becomes difficult to disperse the carbon black and abrasion resistance is deteriorated. It is noted that the BET specific surface area of carbon black is a value measured with the BET method according to ASTM D6556.

A dibutyl phthalate oil absorption amount (DBP) of the carbon black is preferably not less than 50 ml/100 g, more preferably not less than 100 ml/100 g. If the DBP of the carbon black is less than 50 ml/100 g, sufficient grip performance and abrasion resistance may not be obtained. On the other hand, the DBP is preferably not more than 220 ml/100 g, more preferably not more than 180 ml/100 g. If the DBP exceeds 220 ml/100 g, there is a tendency that it becomes difficult to disperse the carbon black and abrasion resistance is deteriorated. It is noted that the DBP of the carbon black is a value measured according to JIS K6217-4:2001.

When the rubber composition comprises carbon black, the content of the carbon black based on 100 parts by mass of the rubber component is preferably not less than 3 parts by mass, more preferably not less than 5 parts by mass. If the content of the carbon black is less than 3 parts by mass, deterioration due to ultraviolet tends to be easy to be promoted. On the other hand, the content of the carbon black is preferably not more than 50 parts by mass, more preferably not more than 40 parts by mass. If the content of the carbon black exceeds 50 parts by mass, wet grip performance tends to be deteriorated. Further, it may become difficult to disperse the carbon black and abrasion resistance may be deteriorated.

A production method of the rubber composition for tire of the present invention is not limited particularly and known methods may be used. For example, the rubber composition can be produced by kneading each of the above components with a rubber kneading apparatus such as an open roll, a Banbury mixer, a sealed kneader or the like, followed by vulcanization.

Since the rubber composition for tire of the present invention can prevent performance change with respect to a strong stimulation such as a contact with the road surface, it can be preferably used for a tread of a tire, in particular a cap tread of a tire.

A tire of the present invention can be produced with a general method using the rubber composition for tire of the present invention. That is, the rubber composition for tire of the present invention is, in the unvulcanized state, processed by extrusion into a shape of each tire component and molded with other components of a tire in a tire molding machine in a general method to produce an unvulcanized tire. This unvulcanized tire is heated and pressurized in a vulcanizer and the tire of the present invention can be produced.

According to the above method, that is, the rubber composition of the present invention comprising the above compounding agents as necessary based on the rubber component of the present invention is, in the unvulcanized state, processed by extrusion into a shape of each tire component, laminated with other components of a tire in a tire molding machine and molded in a general method to produce an unvulcanized tire. This unvulcanized tire is heated and pressurized in a vulcanizer and the tire of the present invention can be produced.

The tire of the present invention can be suitably used as a tire for passenger car, a tire for track/bus, a tire for motorcycle, racing tires and the like, and among these, it can be suitably used as a tire for passenger car since it is excellent in wet skid performance.

EXAMPLES

Though the present invention is explained based on Examples, the present invention is not limited only thereto.

Various kinds of chemicals used in Examples and Comparative Examples are described below.

SBR1: SBR (modified S-SBR, styrene content: 25% by mass, vinyl content: 59 mol %, non-oil-extended product) prepared in the following preparation of SBR1
SBR2: T3830 (S-SBR, styrene content: 33% by mass, vinyl content: 36 mol %, oil-extended product comprising 37.5 parts by weight of oil content based on 100 parts by weight of rubber component) manufactured by Asahi Kasei Chemicals Corporation
SBR3: HP755B (S-SBR, styrene content: 37% by mass, vinyl content: 37 mol %, oil-extended product comprising 37.5 parts by weight of oil content based on 100 parts by weight of rubber component) manufactured by JSR Corporation
SBR4: SLR6430 (S-SBR, styrene content: 40% by mass, vinyl content: 18 mol %, oil-extended product comprising 37.5 parts by weight of oil content based on 100 parts by weight of rubber component) manufactured by Dow Chemical Company
SBR5: Nipol 9549 (E-SBR, styrene content: 40% by mass, vinyl content: 18 mol %, oil-extended product comprising 37.5 parts by weight of oil content based on 100 parts by weight of rubber component) manufactured by Zeon Corporation
BR: BR150B (cis content: 97%) manufactured by Ube Industries, Ltd. Carbon black: SEAST 9H (DBP oil absorption amount: 115 ml/g, BET specific surface area: 110 $m^2/g$) manufactured by Tokai Carbon Co., Ltd.
Silica: ZEOSIL 1165MP ($N_2$SA: 160 $m^2/g$) manufactured by Rhodia Co., Ltd.
Silane coupling agent: silane coupling agent Si75 (bis(3-triethoxysilylpropyl)disulfide) manufactured by Evonik Degussa GmbH
Aroma oil: Process X-140 manufactured by Japan Energy Corporation Anti-aging agent: Santo Flex 13 manufactured by FlexSys Inc.
Stearic acid: stearic acid "Tsubaki" manufactured by NOF Corporation Zinc oxide: Zinc oxide II manufactured by Mitsui Mining & Smelting Co., Ltd.
Sulfur: sulfur powder manufactured by TSURUMI CHEMICAL INDUSTRY CO., LTD.
Vulcanization accelerator 1: Nocceler NS (N-tert-butyl-2-benzothiazylsulfeneamide) manufactured by OUCHI SHINKO CHEMICAL INDUSTRIAL CO., LTD.
Vulcanization accelerator 2: Nocceler D (1,3-Diphenylguanidine) manufactured by OUCHI SHINKO CHEMICAL INDUSTRIAL CO., LTD.
Preparation of SBR1

A stainless polymerization reaction vessel having an inner volume of 20 L was washed, dried and substituted by dry nitrogen, and to the polymerization reaction vessel were added 10.2 kg of hexane (specific gravity: 0.68 $g/cm^3$), 547 g of 1,3-butadiene (manufactured by Tokyo Chemical Industry Co., Ltd.), 173 g of styrene (manufactured by KANTO CHEMICAL CO., INC.), 6.1 ml of tetrahydrofuran (manufactured by KANTO CHEMICAL CO., INC.) and 5.0 ml of ethylene glycol diethyl ether (manufactured by Tokyo Chemical Industry Co., Ltd.). Then, a n-hexane solution in which 13.1 mmol of n-butyllithium (manufactured by KANTO CHEMICAL CO., INC., 1.6 M n-butyllithium hexane solution) was dissolved into n-hexane (manufactured by KANTO CHEMICAL CO., INC.) was added and a polymerization was initialized. A copolymerization of 1,3-butadiene and styrene was conducted for three hours while continuously supplying monomers into the polymerization reaction vessel, with a stirring speed of 130 rpm and a temperature inside the polymerization reaction vessel of 65° C. In the whole polymerization, the supplied amount of 1,3-butadiene was 821 g and the supplied amount of styrene was 259 g. Then, the obtained polymer solution was stirred at a stirring speed of 130 rpm and 11.1 mmol of 3-diethylaminopropyltriethoxysilane was added, followed by stirring for 15 minutes. To the polymer solution was added 20 ml of a hexane solution containing 0.54 ml of methanol, followed by further stirring of the polymer solution for 5 minutes. To the polymer solution were added 1.8 g of 2-tert-butyl-6-(3-tert-butyl-2-hydroxy-5-methylbenzyl)-4-methylphenyl acrylate (manufactured by Sumitomo Chemical Co. LTD., trade name: SUMILIZER GM) and 0.9 g of pentaerythrityl tetrakis(3-laurylthiopropionate) (manufactured by Sumitomo Chemical Co. LTD., trade name: SUMILIZER TP-D) to collect SBR1 from the polymer solution by steam stripping.
Measurement of Vinyl Bond Amount (Unit: Mol %)

According to an infrared spectrum analysis method, a vinyl bond amount of the polymer was calculated with an absorption strength around 910 $cm^{-1}$, which was an absorption peak of a vinyl group.
Measurement of Styrene Content (Unit: % by Mass)

A content of styrene units of the polymer was calculated from a reflective index according to JIS K6383 (1995).

Examples 1 to 8 and Comparative Examples 1 to 4

According to the formulation shown in Table 1, all chemicals other than sulfur and vulcanization accelerators were kneaded for four minutes with a 1.7 L sealed Banbury mixer at the compound temperature at the time of discharge from mixer of 160° C. to obtain a kneaded product. Then, sulfur and the vulcanization accelerators were added to the obtained kneaded product with an open roll and the mixture was kneaded for four minutes to obtain an unvulcanized rubber composition. The obtained unvulcanized rubber composition was press-vulcanized under a condition of 170° C. for 12 minutes to obtain a vulcanized rubber sheet for test.

Further, each rubber sheet was prepared to be in the form of a tread rubber portion using the obtained unvulcanized rubber composition and laminated with other components of a tire to produce a raw tire. Then, in a vulcanization process, the raw tire was press-molded at 170° C. for 20 minutes to produce a tire for test of a size of 195/65R15.

Evaluations were conducted in a method shown in the following using the obtained vulcanized rubber sheets and tires for test. The evaluation results are shown in Table 1.

<Measurement of Complex Modulus G*>

Test pieces having a diameter of 10 mm and a thickness of 2 mm were taken from each vulcanized rubber sheet for test, and a complex modulus G* was measured with a rheometer ARES 2G manufactured by TA Instruments Inc. under a condition where a dynamic strain amplitude was 5%, a frequency was 10 Hz, and temperatures were 50° C. and 100° C.

<Measurement of Elongation at Break EB and Modulus M>

According to JIS K6251 "vulcanized rubber and thermoplastic rubber—calculation of tensile characteristics", a tensile test was conducted under temperatures of 23° C. and 100° C. using a No. 3 dumbbell type test piece comprising each of the vulcanized rubber sheet, and an elongation at break (EB) and a modulus (M) when stretched by 100% at 100° C. were measured.

<Measurement of Loss Tangent Tanδ and Complex Modulus E*>

With a spectrometer manufactured by Ueshima Seisakusho Co., Ltd., a tanδ and E* were measured under a condition where a dynamic strain amplitude was 1%, a frequency was 10 Hz and a temperature was 50° C. with respect to each vulcanized rubber sheet for test. In addition, a tanδ was measured in the state where a dynamic strain amplitude was 0.25% and a frequency was 10 Hz at each temperature from −10° C. up to 20° C. at an interval of 5° C.

<Measurement of Shore Hardness HS>

According to JIS K6253, a Shore hardness (HS) of each vulcanized rubber sheet for test at a temperature of 50° C. was measured with a durometer type A.

<Dry Steering Stability Test>

Each of the test tires was loaded on a domestically produced FF vehicle of 2000 cc on the whole wheel, followed by a test running on a test course of 3 km for 8 laps. Initial dry steering stability and dry steering stability after a performance change were sensorially evaluated by a driver and relatively evaluated, regarding a result of the initial dry steering stability in Comparative Example 1 as 6. It is noted that the initial dry steering stability is dry steering stability at 1st to 3rd laps and the dry steering stability after a performance change is dry steering stability at 4th to 8th laps. It is shown that the higher the score is, the more excellent the dry steering stability is, and the smaller the difference between the score at 3rd lap and the score at 8th lap is, the smaller the performance change is.

<Abrasion Resistance Test>

The appearance of the tires for test after the test running (running on the test course of 3 km for 8 laps) was visually observed and evaluated depending on a presence of an abrasion mark or broken mark of a unique protrusion. The ones where the abrasion mark or broken mark of the unique protrusion was arisen were evaluated as "×" and the ones where such marks were not arisen were evaluated as "○". It is shown that the ones of "○" are more excellent in abrasion resistance.

<Noise Evaluation>

Each tire for test was loaded on the whole wheel of a vehicle (domestically produced FF 2000 cc), followed by running on a road noise measuring road (asphalt rough surface road) at a speed of 60 km/h. The noise within the vehicle was sensorially evaluated by a driver and scored out of ten, regarding the result of Comparative Example 1 as 6. It is shown that the higher the score is, the smaller the noise within the vehicle is and the more excellent the noise characteristics is.

<Wet Grip Performance Test>

Each tire for test was loaded on the whole wheel of a vehicle (domestically produced FF 2000 cc), and the braking distance was measured from the place where the brake was applied at a first speed of 100 km/h on a wet asphalt road and a wet concrete road. The result was shown with an index obtained by the following calculation formula. The larger the index is; the more excellent the wet grip performance is.

(Wet grip performance index)=(braking distance on asphalt road of Comparative Example 1)/(braking distance of each composition)×10

TABLE 1

| | COMPARATIVE EXAMPLES | | | | EXAMPLES | |
|---|---|---|---|---|---|---|
| | 1 | 2 | 3 | 4 | 1 | 2 |
| SBR1 | 85 | — | — | 85 | — | — |
| SBR2 | — | 137.5 | — | — | — | — |
| SBR3 | — | — | 137.5 | — | — | 20.63 |
| SBR4 | — | — | — | — | 96.25 | 116.88 |
| SBR5 | — | — | — | — | — | — |
| BR | 15 | — | — | 15 | 30 | — |
| Carbon black | 5 | 5 | 5 | 5 | 5 | 5 |
| Silica | 90 | 90 | 90 | 60 | 90 | 90 |
| Coupling agent | 7.2 | 7.2 | 7.2 | 5.2 | 7.2 | 7.2 |
| Oil | 47.5 | 10 | 10 | 23 | 10 | 10 |
| Zinc oxide | 2 | 2 | 2 | 2 | 2 | 2 |
| Stearic acid | 2 | 2 | 2 | 2 | 2 | 2 |
| Ant-aging agent | 2 | 2 | 2 | 2 | 2 | 2 |
| Sulfur | 1.5 | 1.5 | 1.5 | 1.5 | 1.5 | 1.5 |
| Vulcanization accelerator 1 | 2.0 | 2.0 | 2.0 | 2.0 | 2.0 | 2.0 |
| Vulcanization accelerator 2 | 2 | 2 | 2 | 2 | 2 | 2 |

TABLE 1-continued

| | | | | | | |
|---|---|---|---|---|---|---|
| G*50° C. | 2.36 | 2.30 | 2.32 | 2.21 | 2.34 | 2.37 |
| G*100° C. | 1.84 | 1.89 | 1.95 | 1.68 | 2.01 | 2.04 |
| EB23° C. | 421 | 478 | 494 | 432 | 430 | 498 |
| tanδ50° C. | 0.16 | 0.18 | 0.20 | 0.11 | 0.19 | 0.20 |
| EB100° C. | 254 | 311 | 324 | 274 | 278 | 324 |
| M100° C. | 9.4 | 9.6 | 11.1 | 9.0 | 9.8 | 10.5 |
| HS50° C. | 59.8 | 61.4 | 61.1 | 57.4 | 62.4 | 61.7 |
| E* | 6.79 | 7.54 | 7.42 | 5.78 | 7.66 | 7.61 |
| tanδ-10° C. | 0.524 | 0.448 | 0.822 | 0.544 | 0.574 | 0.74 |
| tanδ-5° C. | 0.421 | 0.378 | 0.672 | 0.391 | 0.448 | 0.564 |
| tanδ0° C. | 0.339 | 0.333 | 0.515 | 0.313 | 0.348 | 0.429 |
| tanδ5° C. | 0.284 | 0.306 | 0.419 | 0.267 | 0.274 | 0.346 |
| tanδ10° C. | 0.244 | 0.278 | 0.358 | 0.225 | 0.236 | 0.293 |
| tanδ15° C. | 0.211 | 0.258 | 0.288 | 0.195 | 0.211 | 0.249 |
| tanδ20° C. | 0.194 | 0.25 | 0.26 | 0.164 | 0.191 | 0.231 |
| Formula (1) | 0.78 | 0.82 | 0.84 | 0.76 | 0.86 | 0.86 |
| Formula (2) | 2383 | 2995 | 3603 | 2471 | 2713 | 3402 |
| Formula (3) | 0.063 | 0.070 | 0.088 | 0.036 | 0.076 | 0.085 |
| Formula (4) | 2.22 | 2.25 | 3.33 | 2.10 | 2.28 | 2.85 |
| Evaluation result | | | | | | |
| Dry steering stability | | | | | | |
| 3rd lap | 6.00 | 6.25 | 6.50 | 5.25 | 6.50 | 6.50 |
| 8th lap | 4.25 | 4.50 | 5.00 | 4.00 | 6.25 | 6.25 |
| Abrasion appearance | | | | | | |
| Abrasion mark | ○ | ○ | ○ | ○ | ○ | ○ |
| Broken mark | x | ○ | ○ | x | ○ | ○ |
| Noise evaluation | 6.00 | 6.00 | 6.25 | 4.50 | 6.25 | 6.50 |
| Wet grip | | | | | | |
| Asphalt | 100 | 103 | 109 | 96 | 99 | 108 |
| Concrete | 58 | 62 | 82 | 52 | 58 | 80 |

| | EXAMPLES | | | | | |
|---|---|---|---|---|---|---|
| | 3 | 4 | 5 | 6 | 7 | 8 |
| SBR1 | — | — | — | — | — | — |
| SBR2 | — | — | — | — | — | — |
| SBR3 | — | — | — | — | 41.25 | 55 |
| SBR4 | 137.5 | 137.5 | 116.88 | 116.88 | 96.25 | 82.5 |
| SBR5 | — | — | 20.63 | — | — | — |
| BR | — | — | — | 15 | — | — |
| Carbon black | 5 | 5 | 5 | 5 | 5 | 5 |
| Silica | 90 | 90 | 90 | 90 | 100 | 100 |
| Coupling agent | 7.2 | 9.0 | 7.2 | 7.2 | 10.0 | 10.0 |
| Oil | 10 | 15 | 10 | 10 | 18 | 28 |
| Zinc oxide | 2 | 2 | 2 | 2 | 2 | 2 |
| Stearic acid | 2 | 2 | 2 | 2 | 2 | 2 |
| Ant-aging agent | 2 | 2 | 2 | 2 | 2 | 2 |
| Sulfur | 1.5 | 1.5 | 1.5 | 1.5 | 1.2 | 1.0 |
| Vulcanization accelerator 1 | 2.0 | 2.0 | 2.0 | 2.0 | 1.8 | 1.8 |
| Vulcanization accelerator 2 | 2 | 2 | 2 | 2 | 2 | 2 |
| G*50° C. | 2.48 | 2.18 | 2.32 | 2.29 | 2.41 | 2.00 |
| G*100° C. | 2.18 | 2.07 | 2.16 | 2.11 | 2.1 | 1.72 |
| EB23° C. | 477 | 443 | 448 | 429 | 494 | 527 |
| tanδ50° C. | 0.19 | 0.21 | 0.21 | 0.19 | 0.22 | 0.25 |
| EB100° C. | 319 | 279 | 311 | 294 | 416 | 474 |
| M100° C. | 10.3 | 9.7 | 10.8 | 9.8 | 9.4 | 9.1 |
| HS50° C. | 62.8 | 62.4 | 61.9 | 60.9 | 61.1 | 61.4 |
| E* | 7.78 | 8.14 | 7.84 | 7.99 | 8.21 | 8.54 |
| tanδ-10° C. | 0.77 | 0.78 | 0.72 | 0.695 | 0.861 | 0.906 |
| tanδ-5° C. | 0.57 | 0.59 | 0.55 | 0.514 | 0.681 | 0.74 |
| tanδ0° C. | 0.44 | 0.45 | 0.45 | 0.394 | 0.524 | 0.604 |
| tanδ5° C. | 0.33 | 0.34 | 0.37 | 0.321 | 0.427 | 0.501 |
| tanδ10° C. | 0.26 | 0.28 | 0.30 | 0.253 | 0.359 | 0.408 |
| tanδ15° C. | 0.21 | 0.23 | 0.25 | 0.211 | 0.293 | 0.332 |
| tanδ20° C. | 0.17 | 0.19 | 0.22 | 0.197 | 0.264 | 0.284 |
| Formula (1) | 0.88 | 0.95 | 0.93 | 0.92 | 0.87 | 0.86 |
| Formula (2) | 3279 | 2712 | 3362 | 2884 | 3902 | 4294 |
| Formula (3) | 0.074 | 0.087 | 0.091 | 0.074 | 0.096 | 0.119 |
| Formula (4) | 2.75 | 2.86 | 2.85 | 2.59 | 3.41 | 3.78 |
| Evaluation result | | | | | | |
| Dry steering stability | | | | | | |
| 3rd lap | 6.50 | 6.50 | 6.50 | 6.50 | 6.50 | 6.50 |
| 8th lap | 6.50 | 6.50 | 6.50 | 6.50 | 6.25 | 6.25 |

TABLE 1-continued

| Abrasion appearance | | | | | | |
|---|---|---|---|---|---|---|
| Abrasion mark | ○ | ○ | ○ | ○ | ○ | ○ |
| Broken mark | ○ | ○ | ○ | ○ | ○ | ○ |
| Noise evaluation | 6.25 | 6.50 | 6.50 | 6.25 | 6.50 | 6.50 |
| Wet grip | | | | | | |
| Asphalt | 109 | 110 | 107 | 106 | 115 | 122 |
| Concrete | 81 | 81 | 79 | 78 | 89 | 98 |

From the results of Table 1, it can be seen that the rubber composition of the present invention is a rubber composition which has less performance change with respect to a temperature change at a high temperature region and also has less performance change with respect to a road surface change from a wet road surface to a dry road surface.

What is claimed is:

1. A rubber composition for tire in which a complex modulus $G^*_{50°\ C.}$ at 50° C. and a dynamic strain amplitude of 5% and a complex modulus $G^*_{100°\ C.}$ at 100° C. and a dynamic strain amplitude of 5% satisfy the following Formula(1), $$G^*_{100°\ C.}/G^*_{50°\ C.}>0.85 \quad \text{Formula (1):}$$

an elongation at break $EB_{23°\ C.}$ in a tensile test at 23° C. is not less than 350% and a loss tangent $\tan\delta_{50°\ C.}$ at 50° C. and a dynamic strain amplitude of 1% is not less than 0.12.

2. The rubber composition for tire of claim 1, wherein an elongation at break $EB_{100°\ C.}$ in a tensile test at 100° C., and a modulus $M_{100°\ C.}$ when stretched by 100% at 100° C. satisfy the following Formula (2).

$$2500<EB_{100°\ C.}\times M_{100°\ C.}<4500. \quad \text{Formula (2):}$$

3. The rubber composition for tire of claim 1, wherein a Shore hardness $HS_{50°\ C.}$ at 50° C., a complex modulus $E^*$ at 50° C. and a dynamic strain amplitude of 1%, and a loss tangent $\tan\delta_{50°\ C.}$ at 50° C. and a dynamic strain amplitude of 1% satisfy the following Formula (3)

$$0.05<(\tan\delta_{50°\ C.})_2/(E^*\times HS_{50°\ C.})\times 1000 \quad \text{Formula (3)}$$

4. The rubber composition for tire of claim 1, wherein a loss tangent $\tan\delta_{-10°\ C.}$, $\tan\delta_{-5°\ C.}$, $\tan\delta_{0°\ C.}$, $\tan\delta_{5°\ C.}$, $\tan\delta_{10°\ C.}$, $\tan\delta_{15°\ C.}$, and $\tan\delta_{20°\ C.}$ at each temperature from −10° C. up to 20° C. at an interval of 5° C. and a dynamic strain amplitude of 0.25% satisfy the following Formula (4)

$$2.5<\tan\delta_{-10°\ C.}+\tan\delta_{-5°\ C.}+\tan\delta_{0°\ C.}+\tan\delta_{5°\ C.}+\tan\delta_{10°\ C.}+\tan\delta_{15°\ C.}+\tan\delta_{20°\ C.}<4.5 \quad \text{Formula (4).}$$

5. The rubber composition for tire of claim 1, wherein the rubber composition comprises 5 to 150 parts by mass of silica which has a nitrogen adsorption specific surface area of not less than 50 m²/g based on 100 parts by mass of the rubber component.

6. The rubber composition for tire of claim 1, comprising a rubber component comprising not less than 50% by mass of a diene rubber in which a content of styrene is 25 to 50% by mass and a vinyl bond amount is 10 to 35 mol %.

7. The rubber composition for tire of claim 6, wherein the content of styrene is two times or more of the vinyl bond amount.

8. A tire which has a tire member composed of the rubber composition according to claim 1.

* * * * *